3,434,845
METHOD OF TREATING SOYBEANS
Albert C. Groschke, Longmeadow, Mass., assignor to Agway Inc., Syracuse, N.Y., a corporation of Delaware
No Drawing. Filed July 6, 1966, Ser. No. 563,027
Int. Cl. A23l 1/20; A23k 1/14
U.S. Cl. 99—2                                                    4 Claims The present invention relates to an improved method for treating soybeans for the purpose of rendering them suitable for use in animal feeds.

The use of cooked soybeans in animal feeds is by now a well-established and commercially important use of soybeans. Because they provide an excellent source of proteinaceous nutrients, soybean-based animal feeds have been used in all phases of the farm industry.

A particularly important application of soybean-containing feeds is in mashes for poultry. Typically such feeds may be composed of from 30% to 40% soybean meal and from 40% to 50% grain meals together with supplemental nutrients. It is well-known, however, in such feeds that the soybean meal employed must be cooked in order to obtain the most efficacious results. It has been repeatedly found that these raw soybeans are not digested efficiently by poultry, as well as other livestock. The reasons therefor are not fully understood; however, one widely held theory suggests that certain toxic enzymes are present in raw soybeans which interfere with the digestion of the proteinaceous portions of the soybean meal.

It has been found that if the raw soybeans are cooked, typically by exposing them to temperatures of 100 to 130° C. for periods of time of from 10 minues to as much as several hours, the toxins present in the raw soybeans are destroyed. The cooked flour obtained is a highly efficient source of proteins.

It will be evident that the need for cooking soybean flour in order to render it digestible in animal feeds has disadvantages. One obvious disadvantage is that the cooking process itself adds to the cost of the soybean meal, thereby placing soybean flour at an economic disadvantage as compared with other sources of proteins. Moreover, it is also widely recognized that cooking tends to destroy other nutritive factors present in the soybeans. Accordingly, when cooked soybean flour is employed, it is important and critical to use cooking conditions which are just sufficient to destroy the toxins which are present and which at the same time do not destroy the other nutritive values of soybeans beyond the extent necessary.

In accordance with the present invention, a novel process has been found for at least partially detoxifying raw soybeans. More specifically, in accordance with the present invention, it has been found that if the ground raw soybeans are first blended with certain aliphatic diols, the soybean toxins may be at least partly deactivated by subjecting them to high pressure.

The process of the present invention is characterized by the following steps:

(a) Raw soybeans are comminuted, by either flaking or grinding, to an average particle diameter (or thickness) of 10 mesh or finer;

(b) The comminuted or ground raw soybeans are intimately admixed with from 0.5% to 5% by weight of a diol having from about 3 to 6 carbon atoms; and (c) The admixture is then compressed under a presure and for a time sufficient to improve the digestibility of the soybeans.

In the foregoing description of the invention, it will be evident that the degree of comminution of the raw soybeans is not of critical importance so long as the soybeans are comminuted sufficiently to permit the diol readily to permeate the entire mass thereof, and to be accommodated by the compression equipment. While the degree of comminution set forth above is generally appropriate, it is preferable the raw soybeans be ground as finely as possible. A typical soybean meal will have the following particle size distribution: 5% over U.S. No. 10; 30% over U.S. No. 20; 32% over U.S. 40; 11% over US. 60; 22% through U.S. No. 60.

The aliphatic diols which are appropriate for use in the present invention are liquids (i.e., having melting points below approximately room temperature) in order to aid in the incorporation thereof into the raw soybeans. Moreover, the diols should be soluble in both water and fats. Generally, diols containing from about 3 to about 6 carbon atoms are appropriate. Propylene glycol and butanediol are the preferred diols.

Substantially anhydrous diols have been found to be effective in the present invention. However, it is possible that the diol may contain significant amounts of water, so long as the amount of water is not so great as to vitiate the oleophilic characteristics of the diol. It will be noted, in this respect, that the steaming step discussed below may introduce water into the glycol-soybean mixture, so that the mixture which is compressed is efficiently a mixture of wet diol and soybeans.

After blending the raw soybeans with the diol, the mixture is compressed sufficiently to detoxify at least partially the raw soybeans. It is believed that typically compression should be carried out in an apparatus capable of subjecting the diol-soybean mixture to a pressure of several thousand pounds per square inch for a period of at least about a second, although it should be understood that this represents only an estimate, and that the present invention should not be limited thereto. Typically such conditions are readily obtained in conventional extrusion or pelletizing equipment.

In combination with the application of pressure, it may be desirable also to provide for the presence of a small amount of moisture. By way of illustration, mild steaming for 10 seconds to 5 minutes with saturated steam is sufficient. While this amount of steaming by itself appears to have no effect on the soybeans, when taken in combination with the compression effects, improved results are obtained.

In a typical embodiment of the present invention, the ground, raw soybeans, after being impregnated with an appropriate amount of a diol are processed in a pellet mill. In a typical pellet mill the meal being processed is first mildly steamed in the feed supply hopper. From the hopper it falls into the mill which is in the form of a cylindrical shell having a plurality of perforations therein. This shell forms the die (each perforation being a separate pellet-forming die). The meal being processed is forced outwardly through the perforations by one or more rollers acting against the internal surface of the shell, thereby forming a plurality of spaghetti-like strands which are subsequently chopped into pellets of suitable lengths.

The meal being processed in an apparatus of this type may be subjected to pressures of as much as 50,000 p.s.i., although it will be understood that this is only an estimate, inasmuch as the maximum pressures attained in such a die cannot be easily measured. Moreover, in the operation of such equipment the pressure of extrusion is not ordinarily measured. In practical operations, the extrusion die is operated at as high a rate as practical without choking the machine. Thus, after initially starting the machine the feed rate is increased to that point which is just short of the rate at which the machine will stall.

A further limitation on the extrusion rate is the temperature of operation. Many meals employed in such equipment, including soybean meal, tend to scorch if the extrusion pressures are too high. Scorching is caused by compression and by the frictional heat generated when the meal is forced through the die passage, and for soybeans, occurs when the extruded pellets reach temperatures in the order of 215°–220° F. Accordingly, if scorched meals are encountered, the feed rate to the pellet mill is reduced to avoid this. Normally, this will result in a temperature of the extruded pellets of not more than about 210° F.

In a typical operation, the steamed soybean meal leaving the feed hopper of the pellet mill will be at a temperature of 180°–185° F., while the temperature of the extruded pellets may range between about 190° and 200° F.

The finished material obtained from the foregoing process may either be used in pellet form or be comminuted before blending with the other feed materials. Depending on the operation of the pellet mill, the nature of the feed and the amount of steaming of the raw meal prior to compression of the pellets produced may be sufficiently friable so that comminution of the pellets is unnecessary.

The finished soybeans treated in accordance with the present invention may be used in conventional soybean-based ration as is well-known in the art. Typically, the finished meal will be blended with one or more grains, such as corn, wheat or barley; alfalfa meal; fish meals and meat meals as further sources of proteins; distillers fermentation residues; vitamins; minerals; growth promotion factors; etc. A variety of typical poultry rations are illustrated, for example, in the pamphlet entitled "1966 Chicken and Turkey Rations," distributed by the Department of Poultry Science, Storrs Agricultural Experiment Station of the University of Connecticut.

The present invention may be more fully understood by reference to the following example.

EXAMPLE 1

A series of four soybean-based feeds were prepared of the following composition:

| Ingredients (percent by weight) | Diet numbers | | | |
|---|---|---|---|---|
| | 1 | 2 | 3 | 4 |
| Ground yellow corn | 51.36 | 51.36 | 51.36 | 51.36 |
| Pelleted ground raw soybeans | 41.00 | | | |
| Pelleted ground raw soybeans with 1% propylene glycol | | 41.50 | | |
| Pelleted ground raw soybeans with 2% propylene glycol | | | 41.75 | |
| Pelleted ground raw soybeans with 3% propylene glycol | | | | 42.25 |
| Alfalfa meal (20%) | 2.0 | 2.0 | 2.0 | 2.0 |
| Salt | 0.25 | 0.25 | 0.25 | 0.25 |
| Micronutrient Premix No. 1 [1] | 0.50 | 0.50 | 0.50 | 0.50 |
| Delamix [2] | 0.05 | 0.05 | 0.05 | 0.05 |
| d,l-Methionine | 0.12 | 0.12 | 0.12 | 0.12 |
| Dicalcium phosphate | 1.70 | 1.70 | 1.70 | 1.70 |
| Ground limestone | 1.20 | 1.20 | 1.20 | 1.20 |
| Miscellaneous growth factors | 0.05 | 0.05 | 0.05 | 0.05 |
| Cerelose 2001 [3] | 1.77 | 1.15 | 0.68 | |
| Alpha Cel [4] | | 0.12 | 0.34 | 0.52 |

[1] Micronutrient Premix No. 1 supplies the following per pound of finished feed: Vitamin A (U.S.P. units), 2,500; Vitamin D₃ (I.C. units), 500; Vitamin E (Int. units), 1.0; riboflavin (mg.), 2.5; calcium D-pantothenate (mg.), 5.0; choline chloride (mg.), 300.0; Vitamin B₁₂ (mg.), 5.0; niacin (mg.), 15.0; d,l-methionine (mg.), 227.0; santoquin (mg.), 113.5; menadione sodium bisulfite (mg.), 1.0; procaine penicillin (mg.), 2.5; zinc bacitracin (mg.), 2.5.
[2] Delamix provides the following trace elements in the finished feed: Manganese, 60.0 p.p.m.; iron, 20.0 p.p.m.; copper, 2.0 p.p.m.; cobalt, 0.02 p.p.m.; iodine, 1.2 p.p.m.; zinc, 50.0 p.p.m.
[3] Cerelose 2001 is employed as a source of dextrose.
[4] Alpha Cel is a fibrous cellulose employed as a source of inert fibers.

The foregoing formulas are so designed as to provide an isonitrogenous and isocaloric diet. Accordingly, improvements in feed utilization efficiency or feed conversion, will represent improvements attributable to the use of the present invention.

The pelletized ground raw soybeans were processed in a standard pelletizing machine in which the ground raw soybean powder was sprayed with propylene glycol, steaming for about 15–30 seconds, and then compressed into pellets. In Formulas 2, 3 and 4 it will be observed that the raw soybeans contain from 1 to 3% propylene glycol.

The above-described feeds were fed to a series of chicks in a chick growth study to ascertain the effects of heat composition upon chicks' growth and feed utilization. The chicks were divided into groups of 10, and each feeding test was repeated three times. The following results were obtained.

| Diet No. | Average gain (grams) [1] | Average feed conversion [2] |
|---|---|---|
| 1 | 649.7 | 2.21 |
| 2 | 702.6 | 2.14 |
| 3 | 705.7 | 2.08 |
| 4 | 703.7 | 2.11 |

[1] Average gain per bird for three replications of ten birds each.
[2] Average of three replications. Each value represents pounds of feed to produce a pound of gain in live weight from day-old to six weeks of age.

In the utilization of soybeans prepared in accordance with the process of the present invention, the glycol-treated soybeans may be used as a substitution for the soybean faction of conventional soybean-based feed materials. It will be preferable in most instances to use the soybean material of the present invention as only a partial replacement for the soybean faction of conventional feeds. For instance, a typical feed might contain from 40 to 50% of grain meals, from 5 to 20% of cooked soybean meal, from 5 to 20% of glycol-treated soybeans, the balance of the feed being composed of supplementary proteins, vitamins and minerals.

It will be understood that the foregoing specific embodiments of the present invention are for illustrative purposes only, and that, accordingly, the invention is not to be construed as limited thereto.

I claim:
1. A method for treating ray soybeans comprising the steps of:
  (a) comminuting ray soybeans to an average particle size of below 10 mesh,
  (b) blending with said comminuted ray soybeans from ½% to 5% based on the weight of said raw soybeans of an alkylene glycol containing from 3 to 6 carbon atoms; and
  (c) compressing said ground ray soybeans in the presence of said alkylene glycol under a pressure and for a time sufficient to improve the digestibility of the soybeans.
2. A process according to claim 1 wherein said ground soybeans are steamed for 10 seconds to 5 minutes with saturated steam after being combined with said alkylene glycol and prior to being compressed.
3. A process according to claim 1 wherein the alkylene glycol is propylene glycol.
4. A process according to claim 1 wherein the alkylene glycol is a butane diol.

References Cited

UNITED STATES PATENTS 3,051,572  8/1962  Tripple _____ 99—2
3,202,514  8/1965  Burgess et al. _____ 99—2

LIONEL M. SHAPIRO, *Primary Examiner.*

W. A. SIMONS, *Assistant Examiner.*

U.S. Cl. X.R.

99—98, 4